United States Patent
Djelassi

(10) Patent No.: US 9,134,198 B2
(45) Date of Patent: Sep. 15, 2015

(54) METHOD AND DEVICE FOR DETECTING A ROTATIONAL SEPARATION ADVERSELY AFFECTING A TURBINE ENGINE COMPRESSOR

(75) Inventor: Cedrik Djelassi, Marolles en Hurepoix (FR)

(73) Assignee: SNECMA, Paris (FR)

( * ) Notice: Subject to any disclaimer, the term of this patent is extended or adjusted under 35 U.S.C. 154(b) by 242 days.

(21) Appl. No.: 13/808,992

(22) PCT Filed: Jul. 4, 2011

(86) PCT No.: PCT/FR2011/051571
§ 371 (c)(1),
(2), (4) Date: Mar. 21, 2013

(87) PCT Pub. No.: WO2012/004506
PCT Pub. Date: Jan. 12, 2012

(65) Prior Publication Data
US 2013/0186191 A1    Jul. 25, 2013

(30) Foreign Application Priority Data
Jul. 8, 2010 (FR) ..................... 10 55559

(51) Int. Cl.
*G01M 15/14* (2006.01)
*F01D 17/02* (2006.01)
*F01D 21/02* (2006.01)
*F02C 9/16* (2006.01)
*F04D 27/00* (2006.01)

(52) U.S. Cl.
CPC ............. *G01M 15/14* (2013.01); *F01D 17/02* (2013.01); *F01D 21/02* (2013.01); *F02C 9/16* (2013.01); *F04D 27/001* (2013.01); *F05D 2260/80* (2013.01); *F05D 2270/10* (2013.01); *F05D 2270/303* (2013.01); *F05D 2270/304* (2013.01); *F05D 2270/707* (2013.01)

(58) Field of Classification Search
CPC ....................................... G01M 15/14
USPC ................ 73/112.01, 112.03, 112.05, 112.06
See application file for complete search history.

(56) References Cited

U.S. PATENT DOCUMENTS

| 3,867,717 | A |   | 2/1975  | Moehring et al. |
| 4,060,979 | A | * | 12/1977 | Elsaesser et al. ............... 60/773 |

(Continued)

FOREIGN PATENT DOCUMENTS

| EP | 0 418 189 | 3/1991  |
| FR | 2 528 907 | 12/1983 |
| FR | 2 645 909 | 10/1990 |

OTHER PUBLICATIONS

International Search Report Issued Oct. 27, 2011 in PCT/FR11/051571 Filed Jul. 4, 2011.

*Primary Examiner* — Eric S McCall
(74) *Attorney, Agent, or Firm* — Oblon, McClelland, Maier & Neustadt, L.L.P.

(57) ABSTRACT

A method and device detecting a rotating stall affecting a turbine engine compressor. The detection method includes: detecting an abnormal acceleration of the engine or an operating line of the compressor that is characteristic of a failure of the engine; storing a reference temperature measured at an outlet from a turbine of the engine at an instant of detection; comparing a determined temperature threshold with the difference between a current temperature at the outlet of the turbine as measured after detection and the reference temperature; and identifying that a rotating stall is present in event of the threshold being exceeded.

11 Claims, 4 Drawing Sheets

(56) References Cited

U.S. PATENT DOCUMENTS

| | | | |
|---|---|---|---|
| 4,083,235 A | * | 4/1978 | Gallant .................. 73/112.06 |
| 5,012,637 A | | 5/1991 | Dubin et al. |
| 5,051,918 A | | 9/1991 | Parsons |
| RE34,388 E | * | 9/1993 | Dubin et al. .................. 60/779 |

* cited by examiner

METHOD AND DEVICE FOR DETECTING A ROTATIONAL SEPARATION ADVERSELY AFFECTING A TURBINE ENGINE COMPRESSOR

BACKGROUND OF THE INVENTION

The present invention relates to the general field of turbine engines. It relates more particularly to detecting a rotating stall affecting a turbine engine compressor.

The invention applies to any type of turbine engine, and in particular to aeroengines such as turbojets, turboprops, etc.

In known manner, a rotating stall is an aerodynamic instability that affects the compressor and that is characterized by the presence of one or more localized pockets of fluid (referred to as stall pockets or cells) that propagate in the circumferential direction of the compressor, at a speed that is generally slower than the speed of rotation of the compressor.

As a general rule, this instability gives rise to a drop in compression characteristics and it is manifested in particular by a drop in the efficiency and in the compression ratio of the compressor. It is also responsible for major vibratory phenomena that can lead to premature wear of the blades in the compressor.

It can thus readily be understood that it is important to be able to detect the appearance of a rotating stall appearing in the compressor of a turbine engine both quickly and reliably.

In the present state of the art, numerous methods have been proposed in order to solve this problem. Nevertheless, most of these methods rely:
either on detection techniques that do not make it possible to distinguish between a surging situation and a rotating stall situation. This applies in particular to the method proposed in document U.S. Pat. No. 4,581,888;
or else on using sensors that are expensive and unusual in turbine engine, e.g. fast and high-performance pressure sensors as described in document U.S. Pat. No. 6,871,487.

There thus exists a need for a simple, fast, and reliable solution for detecting a rotating stall, and that preferably relies on sensors that are already present in a turbine engine.

OBJECT AND SUMMARY OF THE INVENTION

The invention satisfies this need by proposing a detection method for detecting a rotating stall affecting a compressor of a turbine engine, the method comprising the following steps:
detecting an abnormal acceleration of the engine or an operating line of the compressor that is characteristic of a failure of the engine;
storing a reference temperature measured at the outlet from a turbine of the engine at the instant of detection;
comparing a determined temperature threshold with the difference between a current temperature at the outlet of the turbine as measured after detection and the reference temperature; and
identifying that a rotating stall is present in the event of the threshold being exceeded.

Correspondingly, the invention also provides a detection device for detecting a rotating stall affecting a compressor of a turbine engine, the device comprising:
means for detecting an abnormal acceleration of the engine or for detecting an operating line of the compressor that is characteristic of a failure of the engine;
means for storing a reference temperature measured at the outlet of a turbine of the engine at the instant of detection;
means for comparing a determined temperature threshold with the difference between a current temperature measured after the detection at the outlet of the turbine and the reference temperature; and
means for identifying the presence of a rotating stall in the event of the threshold being exceeded.

In order to detect a rotating stall affecting a compressor of a turbine engine, the invention thus envisages monitoring the increase in temperature at the outlet from the turbine of the engine as from a particular instant. This instant corresponds to the moment either when an abnormal acceleration or an abnormal drop in the speed of the engine is detected, or else when an operating line of the compressor is detected that is characteristic of a failure of the engine.

In other words, the invention advantageously proposes combining a plurality of indicators relating to the behavior of the engine in the presence of a rotating stall (also known as behavior signatures), such as in particular a high level and an increase in the temperature at the outlet from the turbine, an abnormal acceleration of the engine, or an abnormal operating line of the compressor, in order to identify the presence of a rotating stall in the compressor in a manner that is reliable.

Consequently, the invention proposes a detection technique that is simple and based on using sensors that are conventionally used in monitoring engines (temperature sensor, speed sensor), thereby making the technique particularly simple to perform. Thus, by way of example, when the engine is an aircraft turbojet, it is possible for the detection method and the device of the invention to be included on board the aircraft, which constitutes a significant advantage.

In a particular implementation, the detection method further comprises the following steps:
evaluating indicators including at least:
an indicator representative of a limit temperature being exceeded at the outlet from the turbine;
an indicator representative of detecting compressor surging; and
an indicator representative of an abnormal drop of speed of the engine;
evaluating at least one weighted combination of these indicators; and
updating the temperature threshold as a function of the value of the combination.

Correspondingly, in this implementation, the detection device further comprises:
means for evaluating indicators from at least:
an indicator representative of a limit temperature being exceeded at the outlet from the turbine;
an indicator representative of detecting surging of the compressor; and
an indicator representative of an abnormal drop in the speed of the engine;
means for evaluating at least one weighted combination of the indicators; and
means for updating the temperature threshold as a function of the value of the combination.

The use of these indicators makes it possible:
firstly to increase the reliability of detection: this avoids false alarms that are difficult to manage, since they may require the engine to be shut down and relighted; and
secondly to accelerate detection.

It should be observed that in practice it is not possible to obtain accurate knowledge about temperature enabling a rotating stall in a compressor to be diagnosed in reliable manner. The invention serves advantageously to compensate for this inaccuracy by applying the principles of fuzzy logic to detecting a rotating stall.

This is done in particular by updating the temperature threshold that is used for detection. The threshold is preferably taken initially to be sufficiently high to avoid false detection, and is then lowered in accordance with the invention if indicators other than the increase in temperature at the outlet from the turbine suggests the presence of a rotating stall.

These indicators thus serve, so to speak, to weight the detection performed on the basis of the increase in temperature at the outlet from the turbine, thereby enabling detection to be accelerated. As a result detection is both reliable and fast.

The weighted combination(s) evaluated in this implementation can result in particular from combinational logic applied to the indicators.

For example, it is possible to consider a weighted combination that results from applying a logic AND function to:
the indicator representative of exceeding a limit temperature at the outlet from the turbine; and
the indicator representative of detecting surging of the compressor.

In a variant, it is possible to consider a weighted combination that results from applying a logic OR function to:
the indicator representative of exceeding a limit temperature at the outlet from the turbine; and
the indicator representative of an abnormal drop in the speed of the engine.

Naturally, other weighted combinations may be envisaged on the basis of combinational logic or on the basis of weighting factors that are real rather than being binary.

In a particular implementation of the invention, it is detected that the operating line of the compressor is characteristic of a failure of the engine by comparing the ratio of the pressure at the outlet from a combustion chamber of the engine divided by the total pressure at the inlet of a fan of the engine with a predetermined threshold depending on the speed of rotation of the compressor.

Typically, a pressure ratio less than the pressure ratio representative of healthy operation of the engine may be symptomatic of a rotating stall or of flame-out of the engine combustion chamber. Taking other behavior signatures into account in accordance with the invention makes it possible to confirm or to invalidate the presence of a rotating stall.

Comparing the pressure ratio with a predetermined threshold makes it possible to detect a rotating stall early, i.e. before having the opportunity to observe stagnation or under-speed of the engine (i.e. an abnormal acceleration of the engine). This is particularly advantageous at low speed. Such early detection then makes it possible, very quickly, to apply techniques for correcting a rotating stall and thus, in particular, to avoid failure to start the engine.

In an implementation of the invention, when a current temperature is detected that is lower than the reference temperature, this temperature is taken as the new reference temperature.

This makes it possible to track more closely the variation in the temperature at the outlet of the turbine.

In another implementation, the method of the invention also includes a step of identifying an operating stage of the engine, with the detecting, measuring, comparing, and identifying steps being performed if the operating stage as identified in this way is:
a stage of starting or of re-starting the engine; or
a stage of thrust regulation after the engine has been started.

It is during these two stages that the engine is likely to be affected by a rotating stall. Identifying one or other of these stages makes it possible to optimize the search for a rotating stall and to economize engine resources by limiting execution of the method of the invention.

In another aspect, the invention also provides a turbine engine including a detection device in accordance with the invention.

BRIEF DESCRIPTION OF THE DRAWINGS AND THE APPENDIXES

Other characteristics and advantages of the present invention appear from the following description made with reference to the appendixes and to the drawings which show an implementation having no limiting character:

DETAILED DESCRIPTION OF AN IMPLEMENTATION

As mentioned above, the invention proposes applying the principles of fuzzy logic for detecting a rotating stall. More precisely, it advantageously proposes combining a plurality of behavior signatures or indicators of the turbine engine that are all associated with the rotating stall phenomenon, in order to identify the presence of that phenomenon in the compressor in reliable manner.

The term "behavior signature" is used herein to mean behavior characteristic of an operating parameter of the engine (e.g. engine speed, temperature at the outlet from the turbine, operating line of the compressor, etc.) in the presence of a rotating stall.

In the implementations described herein, consideration is given to the following indicators:
a stagnation or a drop in engine speed;
an increase of temperature at the outlet from the turbine of the engine;
a drop in compression ratio (surging);
a high temperature at the outlet from the turbine of the engine; and
an operating line of the compressor characteristic of a failure of the engine.

The term "operating line" is used herein with respect to a compressor to designate how the ratio of the pressure measured at the outlet from the combustion chamber of the engine over the total pressure measured at the inlet of the fan of the engine varies as a function of the speed of rotation of the compressor. This operating line is known to the person skilled in the art and depends on the engine under consideration.

The existence of these indicators suggests the presence of a rotating stall. Naturally, other indicators in addition to those mentioned above could be envisaged in order to further increase the reliability of detection.

Figure 1:
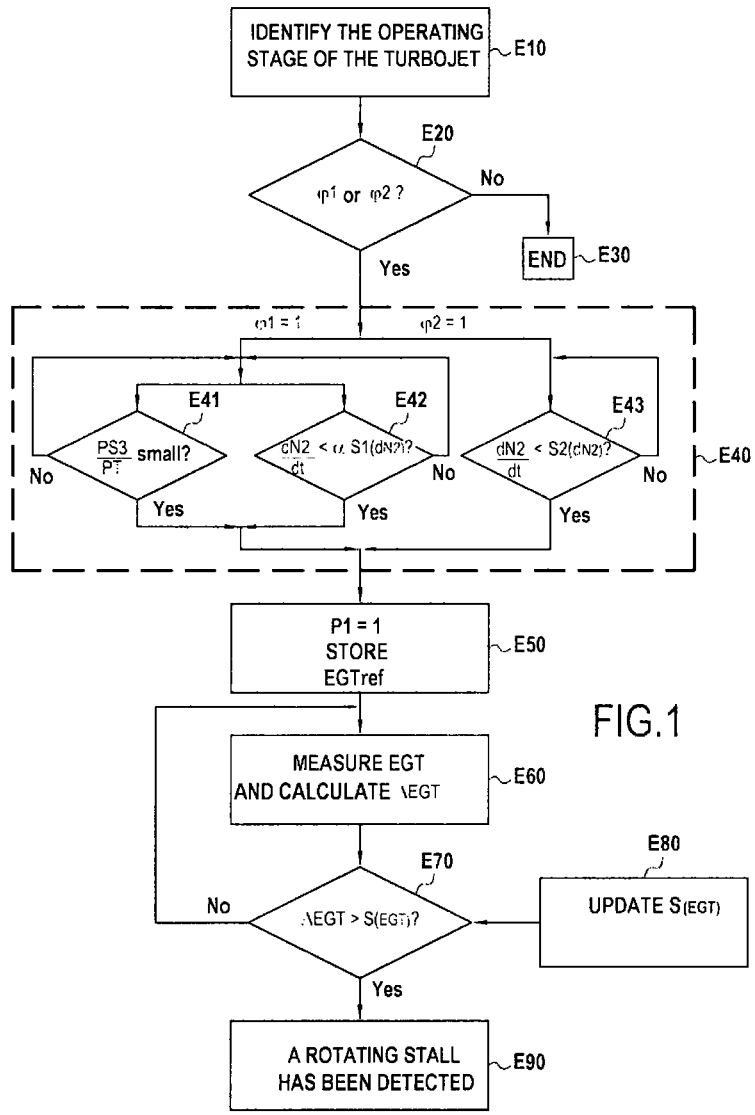
FIG. 1 is a flow chart showing the main steps of a particular implementation of a method of the invention for detecting a rotating stall.

There follows a description with reference to FIG. 1 of the main steps of the detection method of the invention in a particular implementation in which the method is implemented by the engine.

In the example described herein, attention is given to detecting a rotating stall that affects the high-pressure compressor of a two-spool turbojet fitted to an aircraft. Nevertheless, this assumption is not limiting, and the invention can equally well be applied to the low-pressure compressor, and also to other turbine engines.

In known manner, a turbojet can encounter a rotating stall situation during two distinct stages of operation of the turbojet, namely:

during a stage φ1 of starting or of relighting the turbojet (turbojet in "sub-idle" operation); and/or during a stage φ2 of regulating thrust after starting (turbojet in "off-idle" operation).

In accordance with the implementation described herein, the detection method of the invention is performed only when the turbojet is in one or the other of these two stages (i.e. yφ1=1 or φ2=1), with this being in order to conserve the resources of the aircraft.

Thus, initially, the operating stage of the turbojet is identified (step E10). More precisely, it is determined whether the turbojet is in one or the other of the stages φ1 and φ2.

In known manner, the operating stages φ1 and φ2 of the turbojet are easily established:

by analyzing the commands for starting the turbojet, thereby indicating whether it is in the starting/relighting stage φ1; and by interrogating the networks of acceleration correctors of the turbojet, which are in operation while the turbojet is in stage φ2.

If the turbojet is neither in operating stage φ1 nor in operating stage φ2 (φ1=φ2=FALSE=0) (step E20), it is considered that the compressor is not going to be affected by a rotating stall. The detection method therefore comes to an end (step E30).

In contrast, if the turbojet is in operating stage φ1 or operating stage φ2 (φ1=TRUE=1 or φ2=TRUE=1) (step E20), then its speed is examined in order to detect an abnormal acceleration of the turbojet or an operating line of the compressor characteristic of a failure of the turbojet (step E40), if any.

An anomaly in the operating line of the high-pressure compressor constitutes a behavior signature that is symptomatic of a rotating stall that appears very soon in the operation of the turbojet during stage φ1, i.e. shortly after the turbojet has started and at low speed, even before it is possible to detect an abnormal acceleration of the turbojet.

After a turbojet has started, because of the operation on the starter, the spinning of the engine may be normal even though a rotating stall exists in the engine (i.e. no acceleration stagnation is observed up to a certain speed). In contrast, during this period, it is possible, once the compressor has reached a certain speed of rotation, to distinguish an operating line of the compressor that is characteristic of a failure of the turbojet from a normal operating line, and to do so by observing the ratio of the pressure measured at the outlet from the compression chamber of the turbojet divided by the total pressure measured at the inlet of the fan.

Observing this pressure ratio and the operating line of the high-pressure compressor during this period advantageously makes it possible to activate the monitoring of other behavior signatures without delay, and typically monitoring of the temperature at the outlet from the turbine of the turbojet.

As mentioned above, in order to detect an operating line of the compressor that is characteristic of a failure of the engine, attention is given to the ratio of the static pressure PS3 measured at the outlet from the combination chamber of the turbojet divided by the total pressure PT measured at the inlet of the fan. The static pressure PS3 and the pressure PT are measured using pressure sensors that are known to the person skilled in the art and not described in detail herein.

Figure 2:
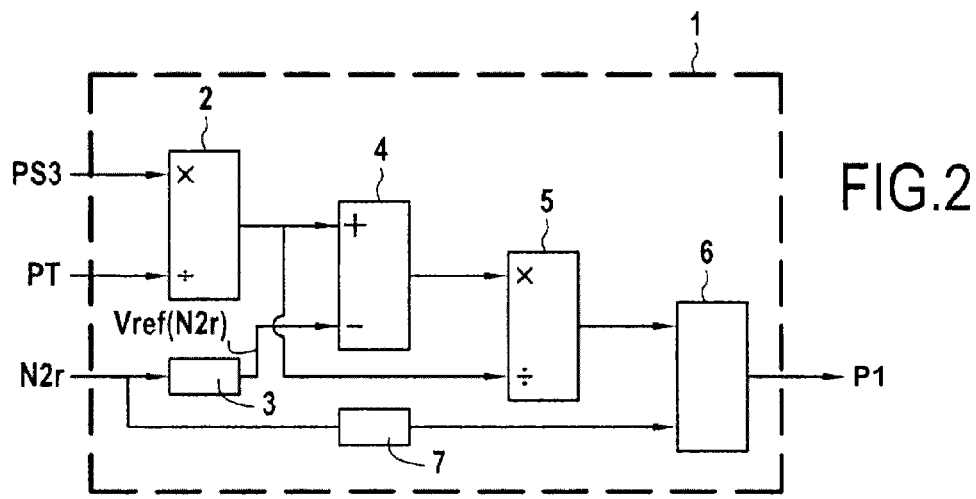
FIG. 2 shows an example of means for detecting an operating line of the compressor characteristic of a failure of the turbine engine.

FIG. 2 shows an example of detector means 1 for detecting an operating line of the compressor that is characteristic of a failure of the turbojet, suitable for use in the invention. These detector means are used only when it is detected that the turbojet is lighted (when the turbojet is out, the rotating stall phenomenon does not exist), and only when the high-pressure compressor has reached a predetermined speed of rotation from which it is possible to distinguish proper operation from failing operation of the turbojet. This speed of rotation may be determined experimentally and raises no difficulty for the person skilled in the art.

In the example of FIG. 2, the ratio of the pressure PS3 divided by the pressure PT, possibly taken at different sampling instants, is compared with a threshold that is determined as a function of the speed of rotation N2 of the compressor reduced by its inlet temperature T25, and written N2r, i.e.:

$$N2r = \frac{N2}{\sqrt{T25/288.15}}$$

This comparison is performed herein in relative manner.

More precisely, the measurements of the pressures PS3 and PT are supplied as inputs to a divider element 2 that is suitable for calculating the ratio PS3/PT.

In parallel with this processing, an estimate of the reduced speed of rotation N2r of the compressor is input to a first digital model 3. It should be observed that the reduced speed of rotation N2r is an operating parameter conventionally used in the monitoring of turbojets. The techniques for obtaining this parameter are therefore known to the person skilled in the art and are not described in greater detail herein.

The first digital model 3 in this example is a database (e.g. a table) that associates a reference value for the pressure ratio (PS3/PT), written Vref(N2r) with various values for the reduced speed N2r. The term "database" is used broadly herein to mean a data set that may present various forms, e.g. the form of a table.

The reference value Vref(N2r) gives an estimate of the pressure ratio PS3/PT for a low speed of rotation N2r below which the operation of the turbojet in question differs from that of a properly operating turbojet. In other words, it characterizes the limit value for the pressure ratio PS3/PT at which it is considered that the turbojet is operating properly. Thus, below the operating line defined by the various reference values as a function of the speed N2r (ignoring a margin), it is considered that the turbojet presents a failure (e.g. rotating stall, flame-out of the combustion chamber, etc.).

This operating line (i.e. the reference values Vref(N2r)) is obtained in experimental manner from a chart of healthy turbojets and of turbojets presenting failures such as a rotating stall.

By way of illustration, Appendix 1, in the form of a table, gives examples of values for the pressure ratio PS3/PT as a function of the low speed of rotation N2r for an engine that is not healthy. These values may be used as reference values and they define an operating line in the meaning of the invention. The table shown in FIG. 1 thus constitutes a database suitable for use as the first digital model.

The reference value Vref(N2r) from the digital model 3 is then subtracted by a subtracter element 4 from the previously calculated ratio PS3/PT.

The output from the subtracter element 4 and the ratio PS3/PT as calculated by the divider element 2 are then supplied as inputs to a divider element 5. This then evaluates the ratio λ defined by:

$$\lambda = \frac{\left(\frac{PS3}{PT}\right) - Vref(N2r)}{\left(\frac{PS3}{PT}\right)}$$

The ratio λ is then compared by a comparator 6 with a predetermined threshold S0(N2r) in order to detect a pressure ratio that is abnormally small (step E41). The threshold S0(N2r) is provided by a second digital model 7, as a function of the reduced speed of rotation N2r.

The second digital model 7 in this example is a database (e.g. a table) that associates various low speed values N2r with a threshold S0(N2r) that is representative of a margin that is taken to be acceptable relative to the healthy operating line of the above-described high-pressure compressor before considering that a failure, such as a rotating stall is affecting the compressor and thus the turbojet. This margin is defined in empirical manner.

By way of illustration, Appendix 2 in the form of a table gives an example of a database suitable for use as the second digital model.

If the ratio λ is less than the threshold S0(N2r), the comparator delivers a logic 1 (otherwise it delivers a logic 0), indicating detection of an operating line of the compressor that is characteristic of a failure of the turbojet. In that event, the indicator P1 is then activated (step E50). By way of example, P1 is a bit that is set to 1 when it is activated, and otherwise set to 0.

If the ratio λ is greater than the threshold S0(N2r), the operating line of the high-pressure compressor (i.e. the ratio PS3/PT) continues to be examined throughout the stage φ1 in order to detect an operating line that is characteristic of a failure of the turbojet, if any.

In a variant, the ratio (PS3/PT) may be compared with a predetermined threshold in absolute manner, i.e. by comparing the ratio (PS3/PT) directly with a threshold.

Another indicator of the presence of a rotating stall is abnormal acceleration of the turbojet. In the presence of a rotating stall, the turbine feed pressure drops, thereby leading to a reduction in driving torque. The rate of acceleration of the turbojet speed then decreases abnormally, in a manner that is noticeable to a greater or lesser extent as a function of the intensity of the rotating stall.

The acceleration of the turbojet may be evaluated from the derivative of the speed of rotation N2 of the shaft of the high-pressure compressor of the turbojet. It should nevertheless be understood that an abnormal acceleration of the turbojet gives rise to different consequences depending on whether the turbojet is in stage φ1 or in stage φ2.

Thus, in known manner, when the turbojet is in starting or relighting stage φ1, the speed of the turbojet (and thus the speed of rotation N2) is controlled by a servo-control loop that is associated with a minimum acceleration threshold (i.e. a minimum acceleration setpoint), that is written S1(dN2).

In order to detect an abnormal acceleration of the turbojet during the stage φ1, it is determined whether the derivative of the speed of rotation relative to time t (i.e. the acceleration), written dN2/dt, drops significantly below the minimum setpoint S1(dN2) (step E42). In other words, it is examined whether:

$$\frac{dN2}{dt} < \alpha \times S1(dN2)$$

where α designates a real coefficient characterizing a "significant" drop below the threshold S1(dN2). For example, if α=0.6 is selected, then an abnormal acceleration is detected if the acceleration of the turbojet is at least 40% less than the expected minimum acceleration.

It is known how to calculate the derivative dN2/dt and this is described below in detail with reference to FIG. 6.

If an abnormal acceleration is detected, the indicator P1 is activated (step E50). By way of example, P1 is a bit set to 1 if an abnormal acceleration has been detected, and otherwise to 0.

Otherwise, the acceleration of the turbojet continues to be examined throughout the stage φ1 in order to detect an abnormal acceleration, if any.

The stage φ2 is an acceleration stage that requires a large amount of power from the turbine. When a rotating stall appears during this stage, the turbojet always suffers "underspeed". The term "under-speed" is used herein to mean an abnormal drop in the core of the turbojet. An abnormal acceleration of the turbojet during the stage φ2 thus gives rise to negative acceleration.

Thus, in order to detect an abnormal acceleration of the turbojet during the stage φ2, it is determined whether the derivative of the speed of rotation relative to time t, dN2/dt, is negative (step E43). In other words, it is examined whether:

$$\frac{dN2}{dt} < S2(dN2) \leq 0$$

S2(dN2) designating a predetermined threshold.

If an abnormal acceleration is detected, the indicator P1 is activated (step E50).

Otherwise, the acceleration of the turbojet continues to be examined throughout the stage p2 in order to detect any abnormal drop in the speed of the turbojet.

Activating the indicator P1 gives rise, immediately or almost immediately, to the outlet temperature from the turbine of the operating turbojet being stored, e.g. in a random access memory (RAM) of the turbojet. This temperature is also known as the exhaust gas temperature (EGT) and it is a parameter that is conventionally measured and tracked throughout the mission of an aircraft, by sensors that are known to the person skilled in the art and not described in detail herein. The temperature as stored in this way is written $EGT_{ref}$. This temperature constitutes a reference temperature in the meaning of the invention.

Under such circumstances, and in accordance with the detection method of the invention, variation in the temperature measured at the outlet from the turbine of the turbojet (written EGT) is analyzed relative to the reference temperature $EGT_{ref}$. It should be observed that if, during this analysis, it is detected that a current temperature EGT is less than the reference temperature $EGT_{ref}$, then the current temperature is taken as a new reference temperature.

For each measurement of EGT, the difference (written ΔEGT) between the measured temperature EGT and the reference temperature $EGT_{ref}$ is evaluated (step E60).

The difference ΔEGT is then compared with a determined threshold S(EGT) (step E70).

In the example described herein, this threshold is initially selected to be large enough to make it possible to detect a rotating stall without running the risk of a false detection. It is determined experimentally, and depends on the speed of rotation N2r of the high-pressure compressor. It is then updated during the detection method of the invention (step E80) in order to accelerate detection of a rotating stall, as described in greater detail below with reference to FIG. 3.

If the difference ΔEGT is greater than the threshold S(EGT), then a rotating stall has been detected (step E90). Following such detection, an alert message may be sent, e.g. to the pilot of the aircraft, in order to indicate the presence of the rotating stall. The pilot may possibility respond by adapting the speed of the turbojet.

If the difference ΔEGT is less than the threshold S(EGT), then the steps E60 and E70 are reproduced with another measurement of the temperature EGT.

As mentioned above, in the implementation described herein, in order to improve detection performance in terms of speed, while guaranteeing a low false detection rate, the threshold S(EGT) is updated (i.e. lowered) when indicators other than a large increase in the temperature EGT suggests the presence of a rotating stall. For this purpose, the invention advantageously makes use of the principles of fuzzy logic.

In known manner, fuzzy logic relies on the mathematical theory of fuzzy sets (i.e. sets that are defined in imprecise manner), and it makes it possible to define the belonging of an element to a class in a manner that is "gradual" (i.e. stronger or weaker). It applies particularly well to fields in which there is no mathematical model nor any accurate knowledge of the phenomena that it is desired to monitor or to control.

The inventors have astutely had the idea of applying this fuzzy logic principle to the detection of a rotating stall, for updating the threshold S(EGT), as described below with reference to FIG. 3.

In the example described herein, in order to decide on whether to update the threshold S(EGT), the following three indicators are evaluated (step E81):
  an indicator i1 representative of a limit temperature $EGT_{lim}$ being exceeded at the outlet from the turbine;
  an indicator i2 representing detection of a compressor surging; and
  an indicator i3 representative of turbojet under-speed, in other words an abnormal drop in its speed.

By way of example, the indicators i1, i2, and i3 are bits that are set to 1 when they are activated, and otherwise they are reset to 0. Thus, i2=1 means that compressor surging has been detected.

Figure 4:
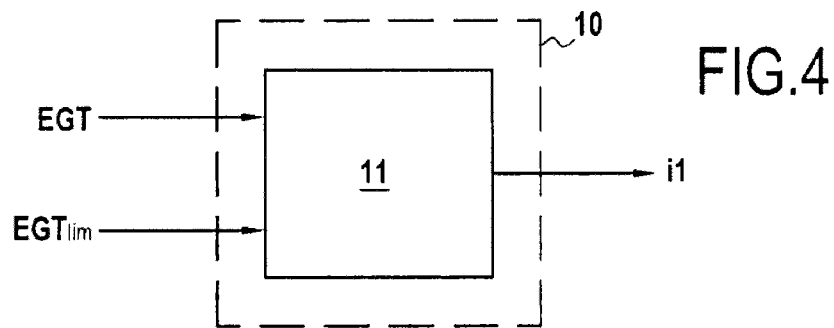
FIG. 4 shows an example of means for evaluating the indicator that is representative of a limit temperature being exceeded at the outlet from the turbine.
Figure 5:
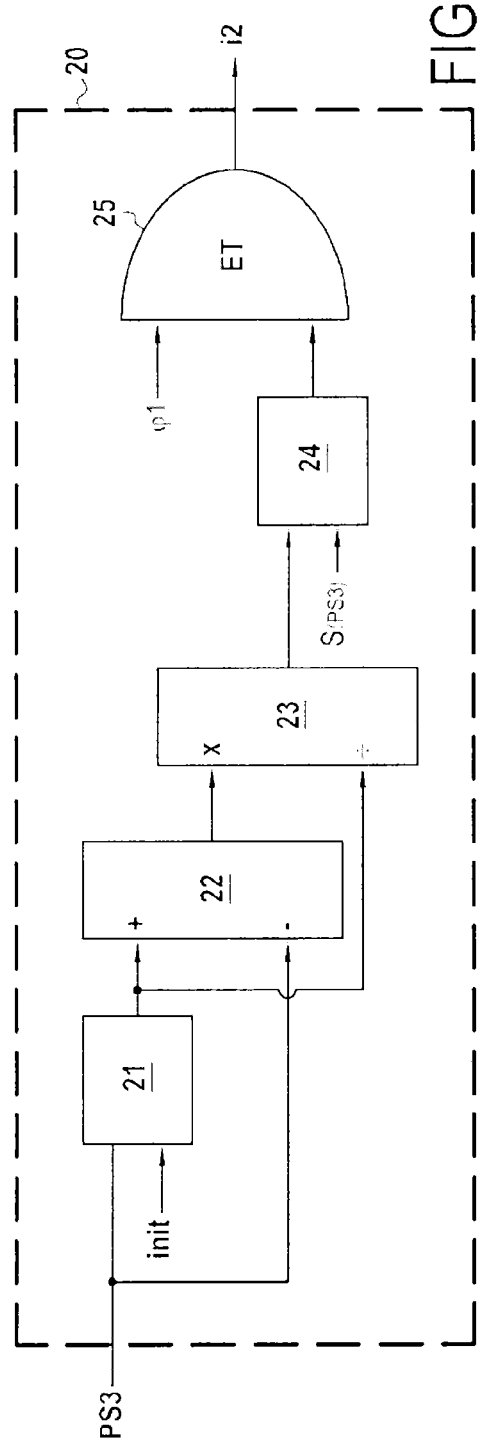
FIG. 5 shows an example of means for evaluating the indicator representative of detecting surging of the compressor.
Figure 6:
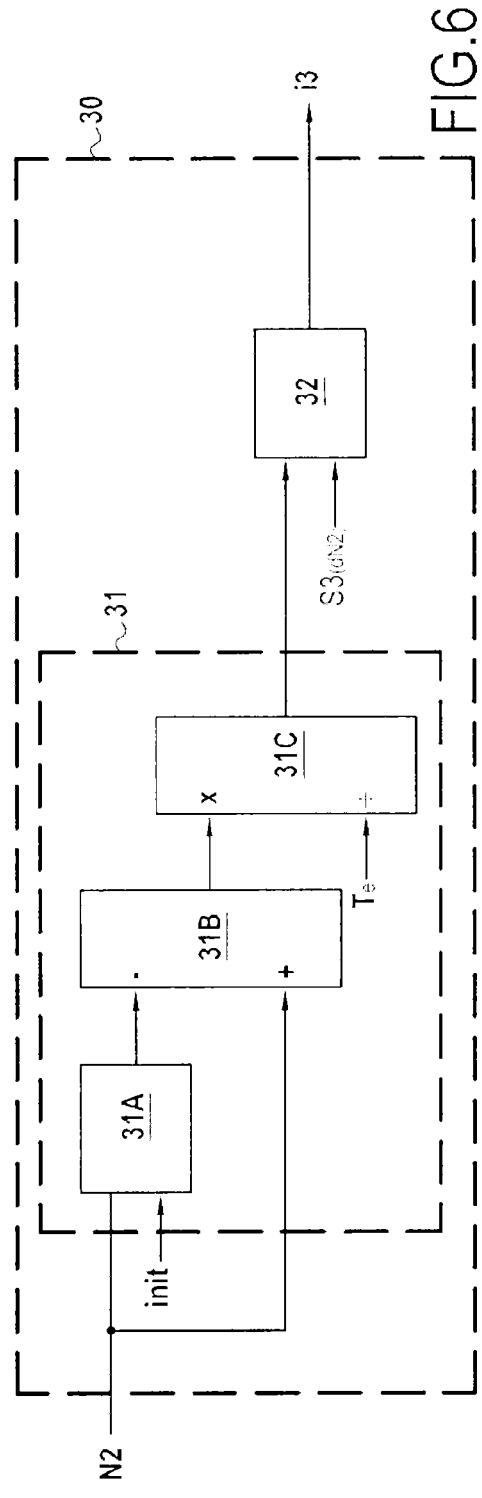
FIG. 6 shows an example of means for evaluating the indicator representative of an abnormal drop of speed in the turbine engine.

FIGS. 4, 5 and 6 show means adapted to evaluating these indicators.

FIG. 4 shows means 10 adapted to evaluating the indicator i1. These means comprise a comparator 11, suitable for comparing each measurement EGT of the temperature at the outlet from the turbojet turbine with the limit temperature $EGT_{lim}$.

If EGT≥$EGT_{lim}$, then the comparator 11 activates the indicator i1 (i1=1). Otherwise the indicator i1 is deactivated (i1=0).

FIG. 5 shows means 20 adapted to evaluating the indicator i2, in other words to detecting the presence (or the absence) of turbojet surging. In the example described herein, this is limited to "sub-idle" surging, i.e. surging that appears when the turbojet is in a "sub-idle" mode of operation (φ1=1). During this mode of operation, surging is nearly always followed by a rotating stall, which makes the indicator i2 particularly pertinent during the starting stage φ1.

In known manner, surging is an aerodynamic instability in the flow of fluid through the compressor that may be accompanied by a reversal of flow in the compressor. The existence of surging gives rise in particular to a drop in the compression ratio of the turbojet.

In order to detect this drop in compression ratio, the means 20 make use of the static pressure PS3 measured at the outlet from the combustion chamber of the turbojet at various instants.

Starting from the pressure PS3 obtained at an instant $nT_e$, where $T_e$ designates the sampling period and n is a relative integer, the means 20 make use of a delay cell 21 to evaluate the pressure PS3 at an instant $(n-1)T_e$.

Thereafter, a subtracter element 22 calculates the pressure difference dPS3 given by:

$$dPS3 = PS3[(n-1)T_e] - PS3[nT_e]$$

where $PS3[nT_e]$ designates the value of the pressure PS3 sampled at instant $nT_e$.

A divider element 23 then divides the difference dPS3 by the value of the pressure PS3 at the instant $(n-1)T_e$.

The output from the divider element 23, dPS3/PS3, is then delivered to a comparator 24. This compares the value of dPS3/PS3 with a predetermined threshold S(PS3), and outputs a 1 if dPS3/PS3>S(PS3), or otherwise a 0.

This output value is then combined with a logic AND gate 25 with the indicator for the stage φ1 in order to give the indicator i2. Thus, if the output value and the φ1 stage indicator are each equal to 1, then the indicator i2 is activated (i2=1). In other words, surging has been detected during the "sub-idle" operating stage of the turbojet. Otherwise, i2 is deactivated (i2=0).

FIG. 6 shows means 30 adapted to evaluating the indicator i3, i.e. to detecting the presence (or absence) of turbojet under-speed. To do this, the means 30 make use of the speed of rotation N2 of the shaft of the high-pressure compressor, as mentioned above.

More precisely, the means 30 comprise a differentiator 31 adapted to evaluate the time derivative dN2/dt. By way of example, this differentiator 31 is the differentiator used above for determining abnormal acceleration during stage (p2. In this example it comprises a first order filter comprising:
  a delay cell 31A, delivering the speed N2 at the instant $(n-1)T_e$;
  a subtracter element 31B enabling the speed N2 at instant $(n-1)T_e$ from the cell 31A to be subtracted from the speed N2 at instant $nT_e$; and
  a divider element 31C adapted to divide the difference obtained at the output from the element 31B by the sampling period $T_e$.

The value of the derivative dN2/dt is then input to a comparator 32. The comparator compares the value of dN2/dt with a predetermined negative threshold S3(dN2), and it activates the indicator i3 if dN2/dt≤S3(dN2) (i3=1), and otherwise deactivates it (i3=0).

Figure 3:
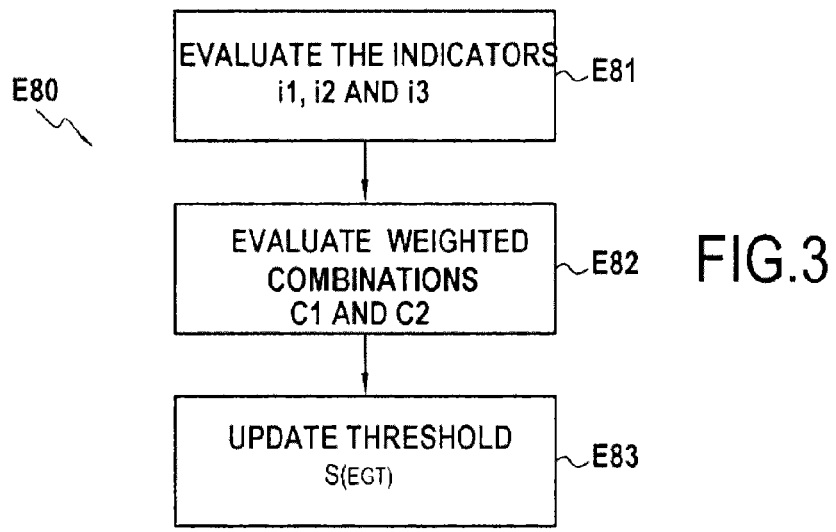
FIG. 3 shows the main steps implemented while updating the temperature threshold in accordance with a particular implementation of the invention.

With reference to FIG. 3, the indicators i1, i2, and i3 as evaluated in this way are then combined (step E82) using predetermined weighted combinations. In the example described herein, the weighted combinations rely on combinational logic. Nevertheless, in a variant, it is possible to envisage using other types of weighting, e.g. with the help of probabilities, etc.

Figure 7:
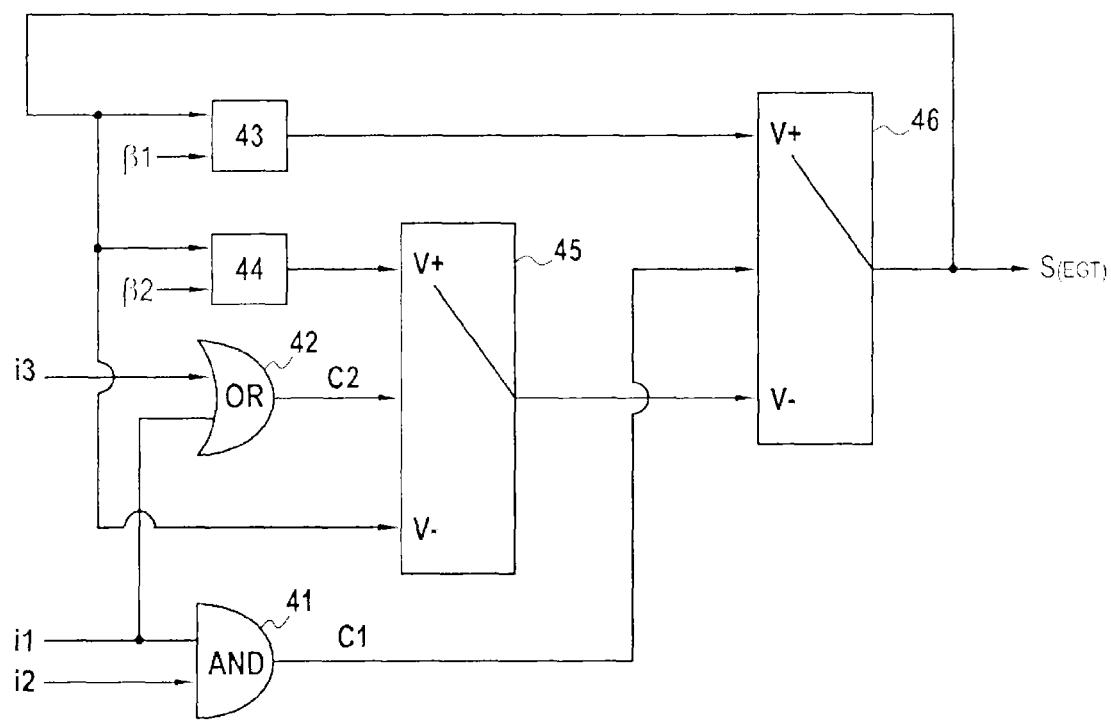
FIG. 7 shows an example of means for evaluating weighted combinations of indicators; and Appendixes 1 and 2 show examples of databases suitable for use by the detection means shown in FIG. 2 for detecting an operating line of the compressor that is characteristic of a failure of the turbine engine, in a particular implementation of the invention.

An example of evaluating two weighted combinations C1 and C2 is shown in FIG. 7. In this example:
- the combination C1 is obtained by applying a logic AND gate 41 to the indicators i1 and i2; and
- the combination C2 is obtained by applying a logic OR gate 42 to the indicators i1 and i3.

The weighted combinations as evaluated in this way are then used to decide whether to update the threshold S(EGT) (step E83), in other words to re-evaluate the threshold S(EGT) downwards if other indicators of a rotating stall are activated.

In the example shown in FIG. 6, the following rules are applied:
- if C1=1: the threshold S(EGT) is reduced by a coefficient $\beta 1$ (e.g. $\beta 1$=85%);
- if C1=0 and C2=1: the threshold S(EGT) is reduced by a coefficient $\beta 2$ (e.g. $\beta 2$=50%); and
- if C1=0 and C2=0: the threshold S(EGT) is left unchanged.

These rules are applied for re-evaluating the threshold S(EGT) with the help of:
- multiplier elements 43 and 44 adapted respectively to multiply the threshold S(EGT) by the coefficients $\beta 1$ and $\beta 2$; and
- decision element (or switches) 45 and 46 adapted respectively to select the input V+ (i.e. the output from the multiplier elements 43 and 44) when C2=1, and respectively C1=1, and the input V− when C2=0, and respectively C1=0.

Naturally, other combinations could be envisaged.

The threshold S(EGT) as updated in this way is then used to detect the rotating stall during the step E70, as described above. Thus, in the presence of other behavior signatures associated with a rotating stall, detection is accelerated.

APPENDIX 1

| | N2r | | | | | | | | |
|---|---|---|---|---|---|---|---|---|---|
| | 4000 | 5000 | 6000 | 7000 | 8000 | 9000 | 10000 | 11000 | 12000 |
| Vref(N2r) | 1.04 | 1.12 | 1.2 | 1.28 | 1.35 | 1.45 | 1.55 | 1.7 | 1.95 |

APPENDIX 2

| | N2r | | | | | | | |
|---|---|---|---|---|---|---|---|---|
| | 5000 | 6000 | 7000 | 8000 | 9000 | 10000 | 11000 | 12000 |
| S0(N2r) | 0.025 | 0.04 | 0.06 | 0.11 | 0.11 | 0.11 | 0.11 | 0.11 |

The invention claimed is:

1. A detection method for detecting a rotating stall affecting a compressor of a turbine engine, the method comprising:
   detecting an abnormal acceleration of the engine or an operating line of the compressor that is characteristic of a failure of the engine;
   storing a reference temperature measured at an outlet from a turbine of the engine at an instant of detection;
   determining a turbine outlet temperature threshold;
   measuring a current temperature at the outlet of the turbine after the detecting and storing are completed;
   comparing the determined turbine outlet temperature threshold with a difference between the measured current temperature at the outlet of the turbine and the reference temperature; and
   identifying that a rotating stall is present in event of the threshold being exceeded.

2. A detection method according to claim 1, wherein the detecting includes:
   measuring a pressure at an outlet from a combustion chamber of the engine,
   measuring a total pressure at an inlet of a fan of the engine,
   measuring a speed of rotation of the compressor, and
   comparing a ratio of the pressure at the outlet from the combustion chamber of the engine divided by the total pressure at an inlet of a fan of the engine with a predetermined threshold depending on the speed of rotation of the compressor.

3. A detection method according to claim 1, wherein when the measured current temperature at the outlet of the turbine is lower than the reference temperature, the measured current temperature at the outlet of the turbine is taken as a new reference temperature.

4. A detection method according to claim 1, further comprising identifying an operating stage of the engine, with the detecting, measuring, comparing, and identifying being performed if the operating stage as identified in this way is:
   a stage of starting or of re-starting the engine; or
   a stage of thrust regulation after the engine has started.

5. A detection method according to claim 1, further comprising:
   evaluating indicators including at least:
     an indicator representative of a predetermined limit temperature being exceeded at the outlet from the turbine;
     an indicator representative of detecting compressor surging; and
     an indicator representative of an abnormal drop of speed of the engine;
   evaluating at least one weighted combination of the indicators; and
   updating the temperature threshold as a function of the value of the at least one weighted combination.

6. A detection method according to claim 5, wherein the value of the at least one weighted combination is a result of combinational logic applied to the indicators.

7. A detection method according to claim 6, wherein the value of the at least one weighted combination results from applying a logic AND function to:
   the indicator representative of exceeding the predetermined limit temperature at the outlet from the turbine; and
   the indicator representative of detecting surging of the compressor.

8. A detection method according to claim 6, wherein the evaluated weighted combination results from applying a logic OR function to:
   the indicator representative of exceeding the predetermined limit temperature at the outlet from the turbine; and the indicator representative of an abnormal drop in the speed of the engine.

9. A detection device for detecting a rotating stall affecting a compressor of a turbine engine, the device comprising:
  means for detecting an abnormal acceleration of the engine or for detecting an operating line of the compressor that is characteristic of a failure of the engine;
  means for storing a reference temperature measured at an outlet of a turbine of the engine at an instant of detection;
  means for determining a turbine outlet temperature threshold;
  means for measuring a current temperature at the outlet of the turbine after the detecting and the storing are completed;
  means for comparing the determined turbine outlet temperature threshold with a difference between the measured current temperature at the outlet of the turbine and the reference temperature; and
  means for identifying presence of a rotating stall in event of the threshold being exceeded.

10. A detection device according to claim 9, further comprising:
  means for evaluating indicators from at least:
    an indicator representative of a predetermined limit temperature being exceeded at the outlet from the turbine;
    an indicator representative of detecting surging of the compressor; and
    an indicator representative of an abnormal drop in the speed of the engine;
  means for evaluating at least one weighted combination of the indicators; and
  means for updating the temperature threshold as a function of the value of the at least one weighted combination.

11. A turbine engine including a detection device according to claim 9.

* * * * *